(12) United States Patent
Yu et al.

(10) Patent No.: US 10,636,121 B2
(45) Date of Patent: Apr. 28, 2020

(54) CALIBRATION METHOD AND APPARATUS FOR PANORAMIC STEREO VIDEO SYSTEM

(71) Applicant: SHANGHAITECH UNIVERSITY, Shanghai (CN)

(72) Inventors: Jingyi Yu, Shanghai (CN); Yi Ma, Shanghai (CN)

(73) Assignee: SHANGHAITECH UNIVERSITY, Shanghai (CN)

( * ) Notice: Subject to any disclaimer, the term of this patent is extended or adjusted under 35 U.S.C. 154(b) by 28 days.

(21) Appl. No.: 16/069,181

(22) PCT Filed: Jan. 12, 2016

(86) PCT No.: PCT/CN2016/070712
§ 371 (c)(1),
(2) Date: Jul. 11, 2018

(87) PCT Pub. No.: WO2017/120776
PCT Pub. Date: Jul. 20, 2017

(65) Prior Publication Data
US 2019/0028693 A1    Jan. 24, 2019

(51) Int. Cl.
*H04N 19/126* (2014.01)
*G06T 3/40* (2006.01)
(Continued)

(52) U.S. Cl.
CPC .......... *G06T 3/4038* (2013.01); *G06K 9/6202* (2013.01); *G06T 3/0093* (2013.01);
(Continued)

(58) Field of Classification Search
CPC .......... G06T 3/4038; G06T 7/74; G06T 7/85; G06T 7/337; H04N 19/126; H04N 19/159;
(Continued)

(56) References Cited

U.S. PATENT DOCUMENTS

| 8,228,560 B2 | 7/2012 | Hooper |
| 9,338,439 B2 | 5/2016 | Grossmann et al. |

(Continued)

FOREIGN PATENT DOCUMENTS

| CN | 102055982 A | 5/2011 |
| CN | 102243432 A | 11/2011 |

(Continued)

OTHER PUBLICATIONS

Extended European Search Report dated May 10, 2019, issued in European Application No. 16884543.6 (12 pages).

(Continued)

*Primary Examiner* — Nguyen T Truong
(74) *Attorney, Agent, or Firm* — Sheppard, Mullin, Richter & Hampton LLP

(57) ABSTRACT

A method of calibrating a camera array comprising a plurality of cameras configured to capture a plurality of images to generate a panorama, wherein the relative positions among the plurality of cameras are constant, the method comprising: moving the camera array from a first position to a second position; measuring a homogeneous transformation matrix of a reference point on the camera array between the first position and the second position; capturing images at the first position and the second position by a first camera and a second camera on the camera array; and determining a homogenous transformation matrix between the first camera and the second camera based on the images captured by the first camera and the second camera at the first position and the second position. The method further comprises identifying a feature in the images taken by the first camera at the first position and the second position, and estimating a rotation of the first camera from the first position to the second position based on the feature.

26 Claims, 5 Drawing Sheets

(51) Int. Cl.

| | | |
|---|---|---|
| *H04N 13/243* | (2018.01) | |
| *H04N 13/239* | (2018.01) | |
| *H04N 13/246* | (2018.01) | |
| *G06T 7/73* | (2017.01) | |
| *G06T 7/80* | (2017.01) | |
| *G06T 7/33* | (2017.01) | |
| *H04N 13/282* | (2018.01) | |
| *H04N 19/159* | (2014.01) | |
| *H04N 19/176* | (2014.01) | |
| *H04N 19/523* | (2014.01) | |
| *H04N 13/106* | (2018.01) | |
| *H04N 13/128* | (2018.01) | |
| *G06K 9/62* | (2006.01) | |
| *G06T 3/00* | (2006.01) | |
| *H04N 5/232* | (2006.01) | |
| *H04N 13/00* | (2018.01) | |

(52) U.S. Cl.
CPC .............. *G06T 3/40* (2013.01); *G06T 7/337* (2017.01); *G06T 7/74* (2017.01); *G06T 7/85* (2017.01); *H04N 5/23238* (2013.01); *H04N 13/106* (2018.05); *H04N 13/128* (2018.05); *H04N 13/239* (2018.05); *H04N 13/243* (2018.05); *H04N 13/246* (2018.05); *H04N 13/282* (2018.05); *H04N 19/126* (2014.11); *H04N 19/159* (2014.11); *H04N 19/176* (2014.11); *H04N 19/523* (2014.11); *G06T 2207/10021* (2013.01); *H04N 2013/0081* (2013.01)

(58) Field of Classification Search
CPC .. H04N 19/176; H04N 19/523; H04N 13/106; H04N 13/128
USPC .......................................................... 348/38
See application file for complete search history.

(56) References Cited

U.S. PATENT DOCUMENTS

| | | | |
|---|---|---|---|
| 9,392,274 | B2 | 7/2016 | Wang et al. |
| 10,313,656 | B2 | 6/2019 | Sadi et al. |
| 10,477,182 | B2 | 11/2019 | Schwarz et al. |
| 2002/0145660 | A1 | 10/2002 | Kanade et al. |
| 2004/0001138 | A1 | 1/2004 | Weerashinghe et al. |
| 2004/0189674 | A1 | 9/2004 | Zhang et al. |
| 2007/0052794 | A1 | 3/2007 | Ha et al. |
| 2008/0002023 | A1 | 1/2008 | Cutler |
| 2011/0069148 | A1 | 3/2011 | Jones et al. |
| 2011/0235706 | A1 | 9/2011 | Demircin et al. |
| 2011/0255589 | A1 | 10/2011 | Saunders et al. |
| 2012/0154518 | A1 | 6/2012 | Zargarpour et al. |
| 2012/0236934 | A1 | 9/2012 | Chen et al. |
| 2012/0249730 | A1 | 10/2012 | Lee |
| 2013/0044186 | A1 | 2/2013 | Jin et al. |
| 2013/0063549 | A1 | 3/2013 | Schnyder et al. |
| 2013/0176390 | A1 | 7/2013 | Chen et al. |
| 2014/0098185 | A1 | 4/2014 | Davari et al. |
| 2014/0125771 | A1 | 5/2014 | Grossmann et al. |
| 2014/0218550 | A1 | 8/2014 | Chuang et al. |
| 2014/0300691 | A1 | 10/2014 | Saito et al. |
| 2014/0307045 | A1 | 10/2014 | Richardt et al. |
| 2014/0355685 | A1 | 12/2014 | Chen et al. |
| 2015/0348580 | A1 | 12/2015 | van Hoff et al. |

FOREIGN PATENT DOCUMENTS

| | | | |
|---|---|---|---|
| CN | 102547357 | A | 7/2012 |
| CN | 103020985 | A | 4/2013 |
| CN | 103108187 | A | 5/2013 |
| CN | 103179405 | A | 6/2013 |
| CN | 103516995 | A | 1/2014 |
| CN | 104169965 | A | 11/2014 |
| CN | 104247432 | A | 12/2014 |
| CN | 104255027 | A | 12/2014 |
| CN | 104424642 | A | 3/2015 |
| CN | 104580933 | A | 4/2015 |
| CN | 104822058 | A | 8/2015 |
| CN | 105049850 | A | 11/2015 |
| CN | 106797459 | A | 5/2017 |
| CN | 106797460 | A | 5/2017 |
| EP | 1679659 | A1 | 7/2006 |
| EP | 2793187 | A1 | 10/2014 |
| WO | 2010085361 | A2 | 7/2010 |
| WO | 2012/136388 | A1 | 10/2012 |
| WO | 2012-136388 | A1 | 10/2012 |
| WO | 2013/151883 | A1 | 10/2013 |
| WO | 2015-085406 | A1 | 6/2015 |
| WO | 2015/085406 | A1 | 6/2015 |
| WO | 2016/048017 | A1 | 3/2016 |
| WO | 2018/064110 | A1 | 4/2018 |

OTHER PUBLICATIONS

Heiko Schwarz et al., "Description of 3D Video Coding Technology Proposal by Fraunhofer HHI (HEVC compatible, configuration B", MPEG Meeting, International Organisation for Standardisation, ISO/IE JT1/SC29/WG11, Coding of Moving Pictures and Audio, Nov. 22, 2011 (46 pages).

Minghui Wang et al., "Region-of-interest based dynamical parameter allocation for H.264/AVC encoder", Picture Coding Symposium, May 6, 2009 (4 pages).

PCT International Search Report and the Written Opinion dated Sep. 22, 2016, issued in related International Application No. PCT/CN2016/070823 (6 pages).

PCT International Preliminary Report on Patentability dated Jul. 26, 2018, issued in related International Application No. PCT/CN2016/070823 (5 pages).

PCT International Search Report and the Written Opinion dated Oct. 17, 2016, issued in related International Application No. PCT/CN2016/071238 (7 pages).

PCT International Preliminary Report on Patentability dated Jul. 26, 2018, issued in related International Application No. PCT/CN2016/071238 (5 pages).

PCT International Search Report and the Written Opinion dated Oct. 19, 2016, issued in related International Application No. PCT/CN2016/070712 (6 pages).

PCT International Preliminary Report on Patentability dated Jul. 26, 2018, issued in related International Application No. PCT/CN2016/070712 (5 pages).

Kun Feng et al., "A Bit Allocation Method for Multi-view Video Coding Based on Stereoscopic Visual Saliency", *Journal of Optoelectronics • Laser*, vol. 24, No. 10, Oct. 31, 2013, pp. 1995-2001.

Haksub Kim et al., "Saliency Prediction on Stereoscopic Videos", *IEEE Transactions on Image Processing*, vol. 23, No. 4, Apr. 30, 2014, pp. 1476-1490.

Extended European Search Report dated Sep. 11, 2019, issued in related European Application No. 16884365.4 (9 pages).

First Search dated Jan. 15, 2020, issued in related Chinese Patent Application No. 201680078524.X (2 pages).

First Office Action dated Jan. 22, 2020, issued in related Chinese Patent Application No. 201680078524.X, with English machine translation (29 pages).

First Search dated Dec. 20, 2019, issued in related Chinese Patent Application No. 201680078558.9 (2 pages).

First Office Action dated Dec. 30, 2019, issued in related Chinese Patent Application No. 201680078558.9, with English machine translation (8 pages).

CALIBRATION METHOD AND APPARATUS FOR PANORAMIC STEREO VIDEO SYSTEM

CROSS-REFERENCE TO RELATED APPLICATIONS

This application is a National Phase application under 35 U.S.C. § 371 of PCT Application No. PCT/CN2016/070712, filed Jan. 12, 2016, the entire contents of which application is hereby incorporated herein by reference.

TECHNICAL FIELD

The present invention relates to panoramic stereo video systems for capturing, processing, compressing, and displaying 3D panoramic stereo videos, and more particularly, to methods and apparatus for calibrating camera arrays in the panoramic stereo video systems.

BACKGROUND

Multi-camera arrays have been widely used in stereo vision and panoramic video systems. Calibrating the extrinsic parameters of these cameras properly is the prerequisite for running any complex vision or video algorithm, as these algorithms will often fail if the spatial relationship between the cameras is not accurately defined. State-of-the-art camera calibration methods perform well when there is a large overlapping region in the camera's field of view (FOV). However, in cases where the overlapping region is small or even does not exist, the conventional methods tend to fail due to low resolution of the overlapping region, or failure to find a common pattern in the overlapping region.

Therefore, there is a need for robust calibration methods for cameras having small or even no overlapping field of view.

SUMMARY OF THE INVENTION

To address issues in the prior art, embodiments of the present invention provide a method and apparatus for calibrating a camera array in a panoramic stereo video system where the cameras have small or even no common field of view.

In accordance with an embodiment of the present invention, an image acquisition apparatus for capturing images to generate a panorama is provided, the image acquisition apparatus comprising: a camera array comprising a plurality of cameras configured to capture a plurality of images to generate a panorama, wherein the relative positions among the plurality of cameras are constant; and a camera calibration unit for calibrating the plurality of cameras; wherein upon the camera array moves from a first position to a second position, the plurality of cameras are configured to capture images at the first position and the second position, and the camera calibration unit is configured to determine a homogenous transformation matrix between a first camera and a second camera based on the images captured by the first camera and the second camera at the first position and the second position.

Preferably, the camera calibration unit is configured to identify a feature in the images taken by the first camera at the first position and the second position, and estimate a rotation of the first camera from the first position to the second position based on the feature.

Preferably, the camera array is configured to move randomly from the first position to the second position.

Preferably, an axis of the camera array at the first position is not parallel to the axis of the camera array at the second position.

Preferably, the first camera and the second camera comprise no over-lapping field of view.

In accordance with another embodiment of the present invention, a method of calibrating a camera array comprising a plurality of cameras configured to capture a plurality of images to generate a panorama is provided, wherein the relative positions among the plurality of cameras are constant, the method comprising: moving the camera array from a first position to a second position; measuring a homogeneous transformation matrix of a reference point on the camera array between the first position and the second position; capturing images at the first position and the second position by a first camera and a second camera on the camera array; and determining a homogenous transformation matrix between the first camera and the second camera based on the images captured by the first camera and the second camera at the first position and the second position.

Preferably, the method further comprises identifying a feature in the images taken by the first camera at the first position and the second position, and estimating a rotation of the first camera from the first position to the second position based on the feature.

Preferably, the method further comprises moving the camera array from a first position to a second position randomly.

Preferably, an axis of the camera array at the first position is not parallel to the axis of the camera array at the second position.

Preferably, the first camera and the second camera comprise no over-lapping field of view.

In accordance with embodiments of the present invention, the cameras in the camera array can be calibrated efficiently and accurately by simply taking pictures simultaneously at different positions, wherein the cameras are not required to have an overlapping field of view.

BRIEF DESCRIPTION OF THE DRAWINGS

To better illustrate the technical features of the embodiments of the present invention, various embodiments of the present invention will be briefly described in conjunction with the accompanying drawings.

DESCRIPTION OF THE PREFERRED EMBODIMENTS

To better illustrate the purpose, technical feature, and advantages of the embodiments of the present invention, various embodiments of the present invention will be further described in conjunction with the accompanying drawings. It is obvious that the draws are but for exemplary embodiments of the present invention, and that a person of ordinary skill in the art may derive additional draws without deviating from the principles of the present invention.

In accordance with embodiments of the present invention, a panoramic stereo video system including multi-camera video capturing, data processing, stereo video coding, transmission, and 3D displaying is provided. The panoramic stereo video system employs real-time multi-view videos capturing, image rectification and pre-processing, and region of interest (ROI) based stereo video compression. After the transmission and decoding process, a head-mounted display (HMD) headset is used to display the left and right views.

1. System Overview

Figure 1:
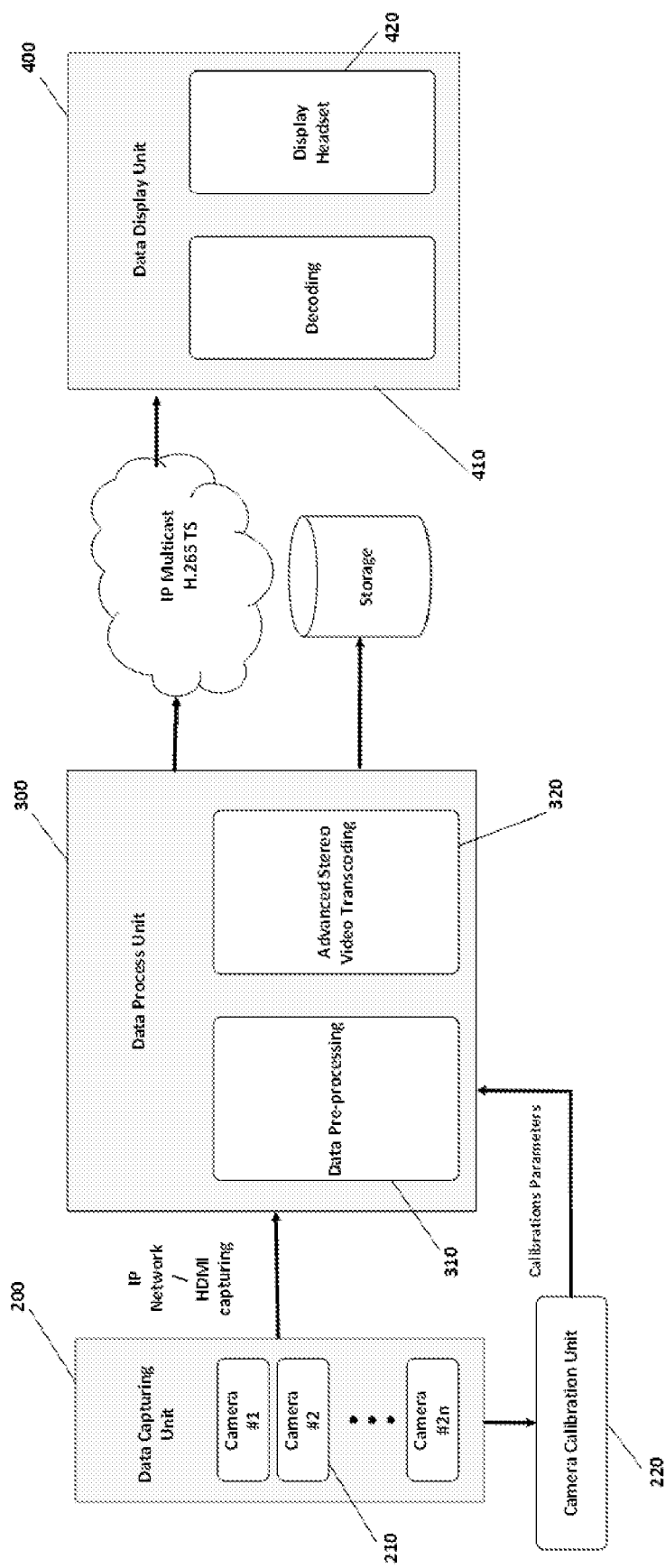
FIG. 1 is an exemplary schematic diagram for a panoramic stereo video system in accordance with an embodiment of the present invention.

FIG. 1 is an exemplary schematic diagram for a panoramic stereo video system in accordance with an embodiment of the present invention. The panoramic stereo video system 100 uses a camera array to capture 3D panoramic video, and displays the captured 3D panoramic video on either a 3D TV or a head-mounted virtual reality display device. As shown in FIG. 1, the panoramic stereo video system 100 includes a data capturing unit 200, a data processing unit 300, and a data display unit 400. The data capturing unit 200 includes a plurality of cameras in a camera array 210, and a camera calibration unit 220. The data processing unit 300 includes a data pre-processing unit 310 and an advanced stereo video transcoding unit 320. The data display unit 400 includes a decoding unit 410, and a display headset 420.

2. Data Capturing Unit

As shown in FIG. 1, the data capturing unit 200 includes a plurality of cameras in a camera array 210, and a camera calibration unit 220 for calibrating the camera array 210.

2.1. Camera Array

Figure 2:
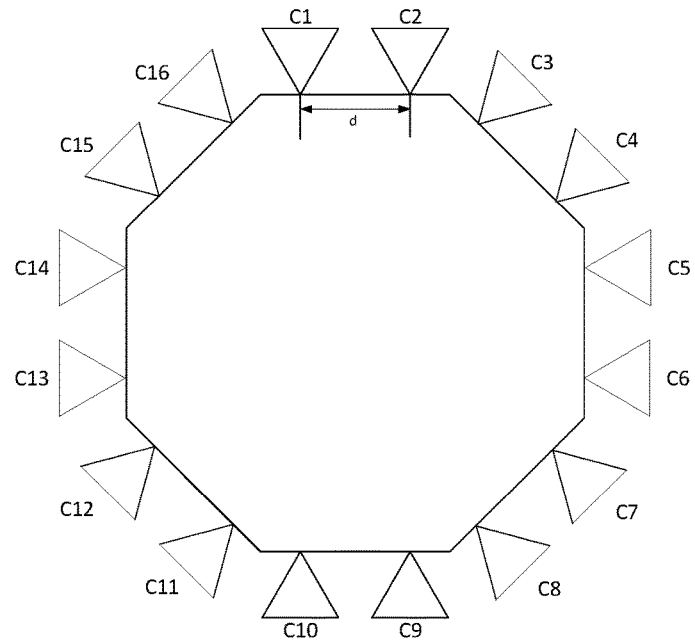
FIG. 2 is an exemplary schematic diagram for a camera array in the panoramic stereo video system in accordance with an embodiment of the present invention.

FIG. 2 is an exemplary schematic diagram for a camera array in the panoramic stereo video system in accordance with an embodiment of the present invention.

As shown in FIG. 2, the camera array 210 has 16 high-definition cameras c1-c16 installed on a mounting frame in the shape of a regular octagon, with a pair of cameras placed on each side of the octagon. The two cameras on each side, such as c1 and c2, have parallel optical axes, and are separated by a distance d. The raw video data captured by the camera array 210 is transmitted through cable to a computer for further processing. The parameters for the camera are listed in Table 1 below.

TABLE 1

| Sensor | OV2710 |
| --- | --- |
| Sensor Size | 1/2.7 inch |
| Pixel Size | 3 * 3 |
| Image Area | 5856 * 3276 |
| Resolution | FULL HD 1920(H) * 1080(V) |
| Frame | MJPEG@30 fps |

TABLE 1-continued

| USB protocol | USB2.0 HS/FS |
| --- | --- |
| AEC | Support |
| AEB | Support |
| AGC | Support |
| Lens Parameter | Standard 2.1 mm, optional/2.5/2.8/3.6/6 mm/FOV(D) 170 Degree/187 Degree |

It should be noted that while the camera array is depicted as a regular octagon in FIG. 2, the camera array can be configured in other shapes in accordance with other embodiments of the present invention. Specifically, in one embodiment of the present invention, the cameras are installed on a rigid frame, so that the relative positions among the plurality of cameras are substantially constant. In another embodiment of the present invention, the cameras are located substantially on the same plane, such as on the sides of a polygon.

2.2. Camera Calibration

To stitch images captured by the cameras together and generate 3D effects, it is necessary to obtain both the internal and parameters of the cameras. The extrinsic parameters include the rotation and translation among the cameras, so that the images captured by different cameras can be rectified and aligned in the horizontal direction. Also, there may be distortions in the images captured by the cameras, and to obtain images free of the distortions, it is necessary to know the camera distortion parameters. These parameters are obtained during the camera calibration process.

2.2.1. Calibration of Internal and Distortion Parameters

The internal and distortion parameters of the cameras can be obtained using a variety of methods, such as the calibration method proposed by Zhengyou Zhang, and tools like MatLab can be employed to obtain these parameters.

2.2.2. Calibration of Extrinsic Parameters

After obtaining the internal parameters of the cameras, a method based on structure from motion is employed to obtain the rotations and translations among the cameras. This method has the following advantages.

Efficiency: there is no need to calibrate the cameras pair by pair. Rather, all cameras capture videos of a scene simultaneously during calibration, and the extrinsic parameters for all the cameras can be obtained at the same time.

Accuracy: in pattern-based calibration methods, the pattern needs to be captured by two adjacent cameras, which often results in lower resolution for the pattern and reduces the accuracy of the calibration. In our structure from motion based method, the movement of each camera will be estimated independently to obtain the parameters, and there is no need for adjacent cameras to have an overlapping field of view. Thus, we can place the cameras closer to the scene to be captured to achieve better accuracy.

Extensibility: since our method does not require an overlapping field of view for adjacent cameras, it is even applicable to cameras placed in back-to-back positions.

2.3. Data Capturing Method

Data from the 16 cameras are captured and stored using software, and then provided to the data processing unit. Image data for each frame captured by the cameras can be collected using software such as FFmpeg and DirectShow (or DShow). The frames captured by each camera are compressed and then stored as video files. Since there are a number of cameras, the frames captured by the cameras need to be synchronized, such as using time stamps. For example, each frame captured by the cameras can be affixed with a time stamp, and placed in a queue so that it is synchronized with other frames with the same time stamp. The synchronized frames are coded into video streams, and stored locally or transmitted through the network together.

3. Data Processing Unit

As shown in FIG. 1, the data processing unit 300 includes data pre-processing unit 310 and an advanced stereo video transcoding unit 320.

Figure 3:
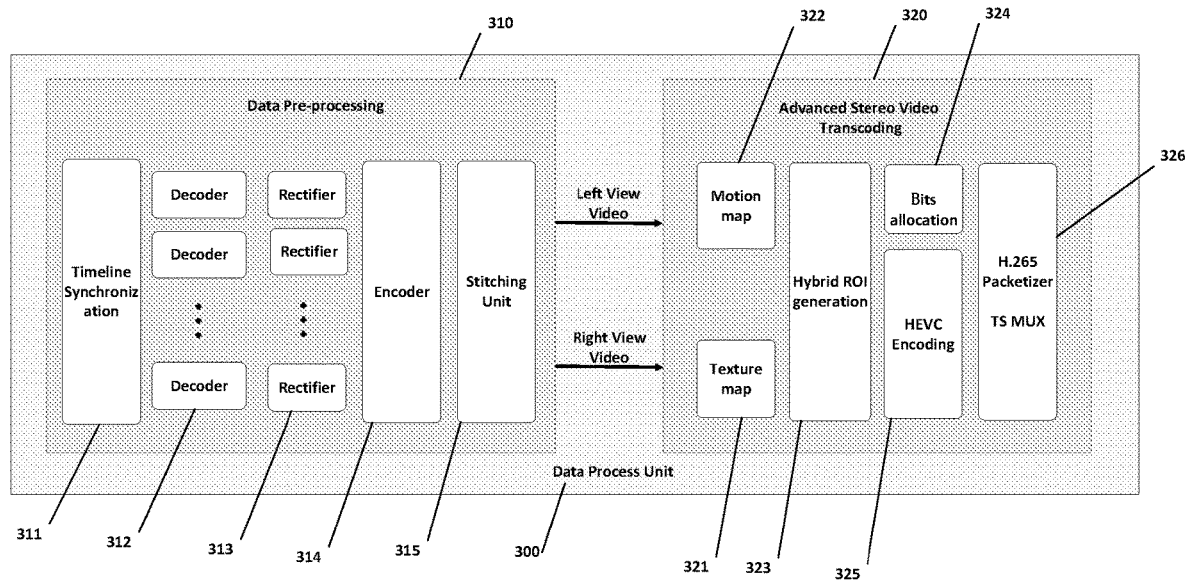
FIG. 3 is an exemplary schematic diagram for a data processing unit in a panoramic stereo video system in accordance with an embodiment of the present invention.

FIG. 3 is an exemplary schematic diagram for a data processing unit in a panoramic stereo video system in accordance with an embodiment of the present invention. As shown in FIG. 3, the data pre-processing unit 310 includes a timeline synchronization 311 for synchronizing the images captured by the cameras, a number of decoders 312 for decoding streams of raw video, a number of rectifiers 313 for rectifying the raw video, an encoder 314 for video processing, including noise reducing and editing, a stitching unit for stitching videos to generate panoramic video. The data pre-processing unit 310 outs a left view video and a right view video to the advanced stereo video transcoding unit 320. The advanced stereo video transcoding unit 320 generates a motion map 321 and a texture map 322 for the video, and a hybrid region of interest (ROI) generating unit 323 identifies regions of interests in the videos based on the motion map and 321 the texture map 322. A bits allocation unit 324 allocates bits based on the identified region of interests, and a HEVC encoding unit 325 encodes the videos. A H.265 packetizer 326 packs the encoded videos for transmission.

Figure 4:
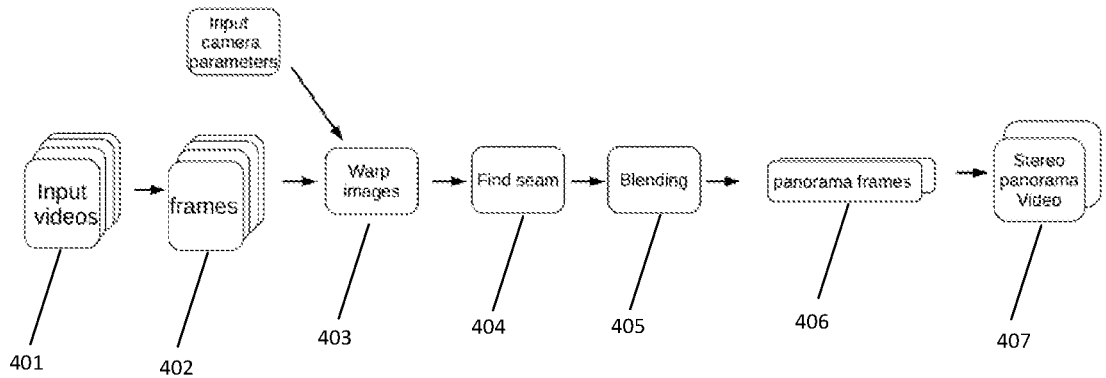
FIG. 4 is an exemplary flowchart for a method of stitching a panoramic stereo video in accordance with an embodiment of the present invention.

FIG. 4 is an exemplary flowchart for a method of stitching a panoramic stereo video in accordance with an embodiment of the present invention.

3.1 Distortion Correction and Preprocessing

The frames captured by the cameras are warped in accordance with the distortion parameters obtained during the calibration process to obtain frames free of distortions. In order to enhance the accuracy of image alignment and stitching, the frames are filtered first to reduce noises.

3.2. Image Alignment

Image alignment is performed on each pair of cameras located on each side of the octagon, and the images captured by each pairs of cameras are aligned in the horizontal direction. In accordance with an embodiment of the present invention, each frame captured by the pairs of cameras is warped to a plane that is parallel to the optical axes of the fair of cameras.

4. Panoramic Video Stitching

The camera array has 8 pairs of cameras. The frames captured by all the left cameras are projected onto a cylinder, and then stitched into a panoramic image. A panoramic video can be obtained by repeating the above steps for all the frames captured by the left cameras. Another panoramic video can be obtained by processing the frames captured by the right cameras in the same fashion. These two panoramic videos form a panoramic stereo video.

5. Data Display Unit

As shown in FIG. 1, the data display unit 400 includes a decoding unit 410, and a display headset 420. After going through an encoding and decoding system, the panoramic stereo video is played on display headset 420, which can be a wearable virtual reality (VR) equipment, such as one provided by Oculus VR. The panoramic stereo video is rendered respectively to the left display and the right display of the Oculus device. The display area of the panoramic stereo video can be adjusted in accordance with the movement of the detection device to simulate the change in perspective in the virtual reality.

Figure 5:
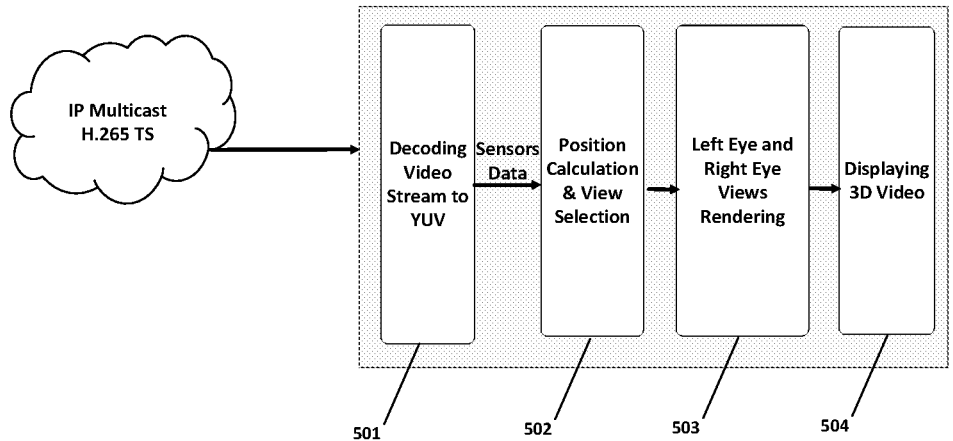
FIG. 5 is an exemplary flowchart for a method of displaying a panoramic stereo video in accordance with an embodiment of the present invention.

FIG. 5 is an exemplary flowchart for a method of displaying a panoramic stereo video in accordance with an embodiment of the present invention. As shown in FIG. 5, in step 501, the encoded video stream is first decoded to YUV. In step 502, position calculation and view selection are made in accordance with the Oculus sensors data. In step 503, the images for the left eye and the right eye are respectively rendered. In step 504, the rendered images are displayed on the Oculus display headset.

Figure 6:
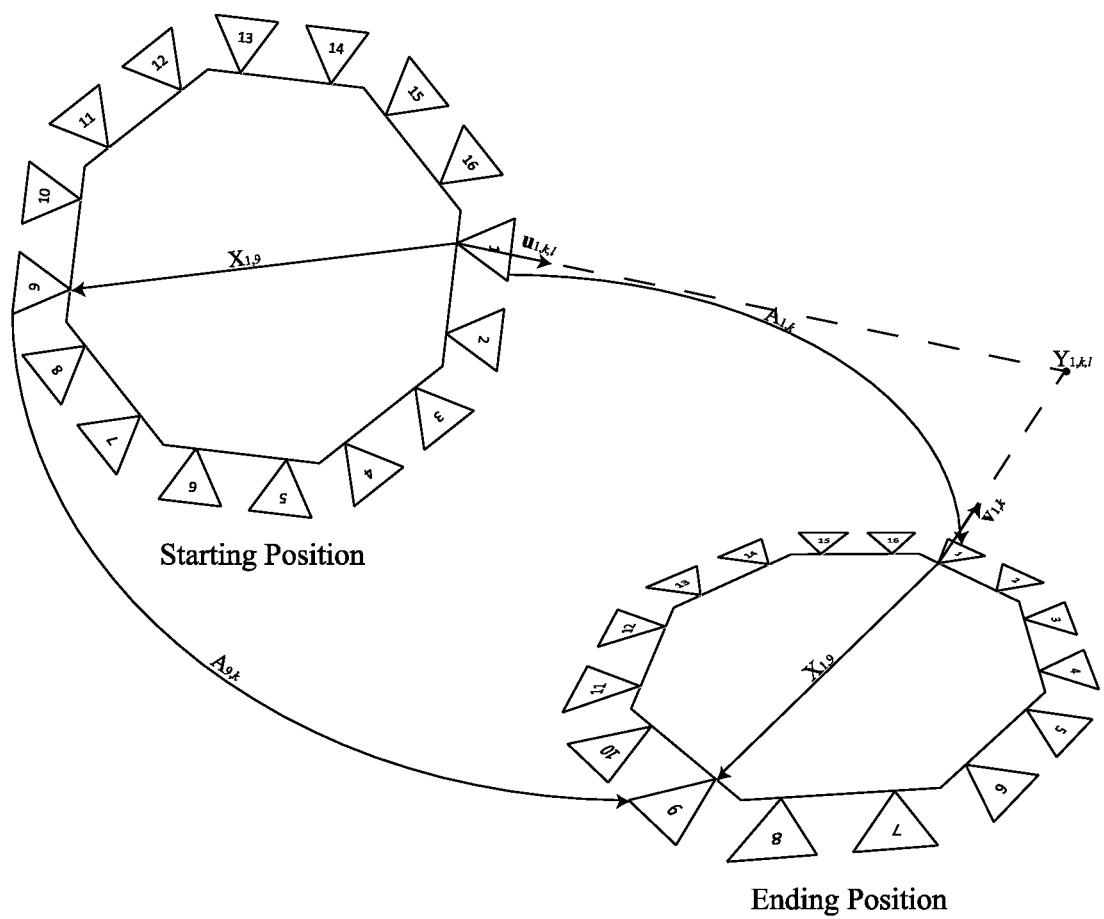
FIG. 6 is an exemplary schematic diagram for a camera array moving from a starting position to an ending position during a calibration process in accordance with an embodiment of the present invention.

FIG. 6 is an exemplary schematic diagram for a camera array moving from a starting position to an ending position during a calibration process in accordance with an embodiment of the present invention. As shown in FIG. 6, during the calibration process, the camera array is moved from a starting position to an ending position, wherein the axis of the camera array at the starting position is not parallel to the axis at the second position.

Optionally, apart from these cameras, the camera array is connected to an Inertial Measurement Unit (IMU) which can be used to get the motion of the camera array. The IMU can be a motion sensor. The IMU can be placed at a fixed position on the camera array, such as at the center of the camera array, or at the same position as one of the cameras.

Alternatively, the motion of the camera array from the starting position to ending position can be measured by other means, and transmitted to the calibration unit separately.

It should be noted that while FIG. 6 only depicts the starting position and the ending position, the camera array may be moved through a number of positions. Preferably, the starting position, the ending position, and any other positions that the camera array may be in during the calibration process are chosen randomly. Specifically, the accuracy of the calibration can be further improved by moving the camera array through a number of positions, and the calibration method will be further described below using the following notations:

$p_{i,k}$: The position of camera i after k-th movement.

$X_{i,j}$: The homogeneous transformation matrix between camera i and j, where $$X_{i,j} = \begin{bmatrix} R_{X_{i,j}} & T_{X_{i,j}} \\ 0^T & 1 \end{bmatrix}$$

$A_{i,k}$: The homogeneous transformation matrix from position k to k+1 of camera i $$A_{i,k} = \begin{bmatrix} R_{A_{i,k}} & T_{A_{i,k}} \\ 0^T & 1 \end{bmatrix}$$

Where $R_{A_{i,k}} \in SO(3)$ and $T_{A_{i,k}} \in R^3$ are the relative rotation and transformation of $p_{i,k}$ and $p_{i,k+1}$.

$X_i$: The homogeneous transform matrix between camera i and IMU.

$$X_i = \begin{bmatrix} R_{X_i} & T_{X_i} \\ 0^T & 1 \end{bmatrix}$$

$B_k$: The homogeneous transformation matrix of IMU from place k to k+1, and $$B_k = \begin{bmatrix} R_{B_k} & T_{B_k} \\ 0^T & 1 \end{bmatrix}$$

In the below calculations, all the cameras are modeled by the pinhole camera model with distortions, and the intrinsic matrices $K_i$ and the distortion parameters $kc_i$ are supposed to be known.

In accordance with an embodiment of the present invention, the calibration method includes the following steps:

1. Move the camera array and make all the cameras take a picture simultaneously at each place for n times. Record the IMU data and get $B_k$. It is better to avoid rotating around parallel rotation axes for better performance.

2. Estimate $R_{A_{i,k}}$ using the structure from motion method, where k represent the k-th movement of the camera array.

3. Estimate $R_{X_i}$ that minimizes $\eta = \Sigma_{k=1}^n d(R_{A_{i,k}} R_{X_i}, R_{X_i} R_{B_k})$ for all the n movements, where d is some suitably-defined distance metric on SO(3).

4. Find $T_{X_i}$ that satisfies $$\angle(u_{ikl}, Y_{ikl}) \leq \gamma$$

$$\angle(v_{ikl}, R_{X_i} R_{A_{ik}} R_{X_i}^T Y_{ikl} + (I - R_{X_i} R_{A_{ik}} R_{X_i}^T) T_{X_i} + R_{X_i} T_{A_{ik}}) \leq \gamma$$

for some error limit $\gamma$ for all the movements and cameras, where $R_{X_i}$ comes from step 3 above, $u_{ikl}$ and $v_{ikl}$ are the l-th corresponding points of camera i between places k and k+1. The optimal $R_{X_i}$ can be found using the bisection method.

5. Get the extrinsic parameters between camera i and camera j through:

$$X_{ij} = X_i^{-1} X_j$$

Figure 7:
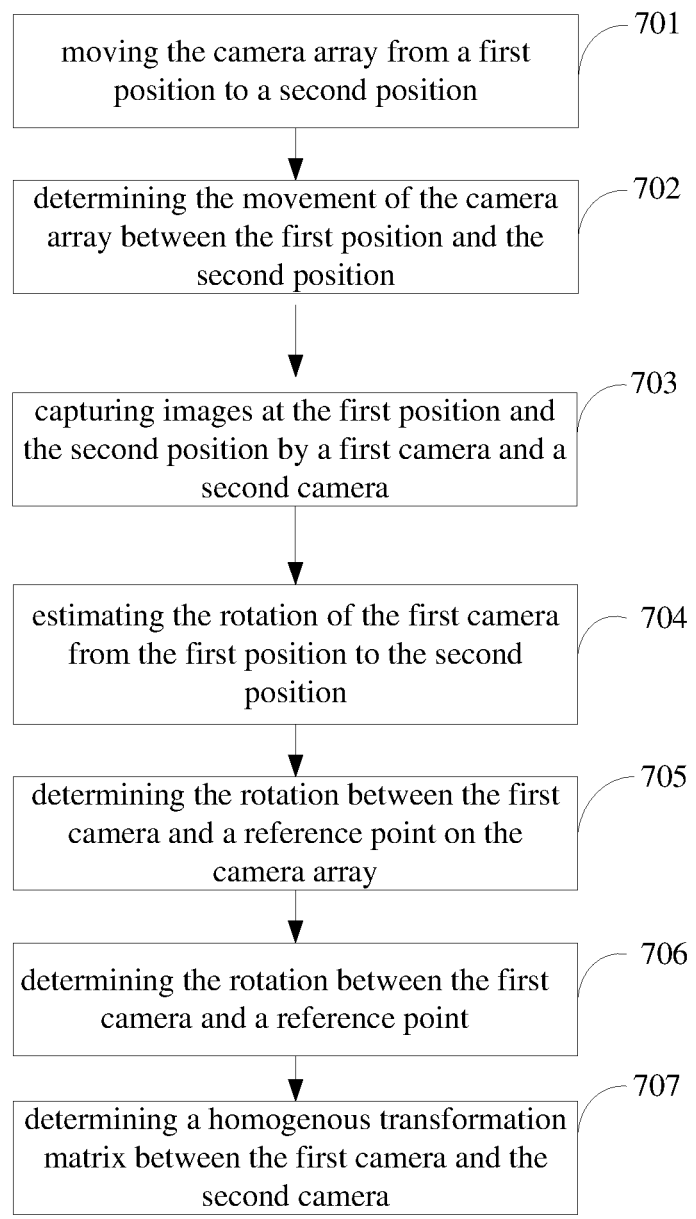
FIG. 7 is an exemplary flowchart for a method of calibrating a camera array in accordance with an embodiment of the present invention.

FIG. 7 is an exemplary flowchart for a method of calibrating a camera array in accordance with an embodiment of the present invention. As shown in FIG. 7, the calibration includes the following steps.

Step 701: moving the camera array from a first position to a second position.

Step 702: determining the movement of the camera array between the first position and the second position. Here, the movement of the camera array can be specified using a homogeneous transformation matrix of a reference point on the camera array between the first position and the second position.

Step 703: capturing images at the first position and the second position by a first camera and a second camera. Here, we simply need to take pictures at these two positions using these two cameras.

Step 704: estimating the rotation of the first camera from the first position to the second position. A structure from motion method can be used to first identify a feature in the images taken by the first camera at the first position and the second position, and then estimate the rotation of the first camera from the first position to the second position based on the position of the identified feature in the pictures.

Step 705: determining a rotation between the first camera and the reference point by minimizing a defined distance.

Step 706: determining a transformation between the first camera and the reference point by minimizing a re-projection error.

Step 707: determining a homogenous transformation matrix between the first camera and the second camera based on the images captured by the first camera and the second camera at the first position and the second position. Here, the relative rotation and translation between the first camera and the second camera can be calculated from the parameters determined in previous steps.

The calibration method has the following advantages:

1. Efficiency. There is no need to calibrate the cameras pair by pair, or to hold up the chessboard for calibration. We just need to take photos of a scene simultaneously from different positions.

2. Accuracy. When the overlapping field of view of two cameras is distant from the cameras, as often the case in the setting of pattern-based calibration methods, the pattern's resolution becomes very low, as the pattern needs to be in the common area of the field of view of the two cameras. This will adversely affect the accuracy of the calibration. However, our method estimates the motion of different cameras independently, and does not require a common area in the field of view of the cameras. Thus, the cameras can be placed closer to the scene, making its calibration more accurate.

3. Extensibility. Since structure from motion method does not require the cameras to have an overlapping field of view, our method is applicable even when the cameras are back to back. This will reduce the accumulative error since we can calculate the transformation from any camera coordinate to the reference camera coordinate.

In sum, in accordance with embodiments of the present invention, the cameras in the camera array can be calibrated efficiently and accurately by simply taking pictures simultaneously at different positions, wherein the cameras are not required to have an overlapping field of view.

The various modules, units, and components described above can be implemented as an Application Specific Integrated Circuit (ASIC); an electronic circuit; a combinational logic circuit; a field programmable gate array (FPGA); a processor (shared, dedicated, or group) that executes code; or other suitable hardware components that provide the described functionality. The processor can be a microprocessor provided by from Intel, or a mainframe computer provided by IBM.

Note that one or more of the functions described above can be performed by software or firmware stored in memory and executed by a processor, or stored in program storage and executed by a processor. The software or firmware can also be stored and/or transported within any computer-readable medium for use by or in connection with an instruction execution system, apparatus, or device, such as a computer-based system, processor-containing system, or other system that can fetch the instructions from the instruction execution system, apparatus, or device and execute the instructions. In the context of this document, a "computer-readable medium" can be any medium that can contain or store the program for use by or in connection with the instruction execution system, apparatus, or device. The computer readable medium can include, but is not limited to, an electronic, magnetic, optical, electromagnetic, infrared, or semiconductor system, apparatus or device, a portable computer diskette (magnetic), a random access memory (RAM) (magnetic), a read-only memory (ROM) (magnetic), an erasable programmable read-only memory (EPROM) (magnetic), a portable optical disc such a CD, CD-R, CD-RW, DVD, DVD-R, or DVD-RW, or flash memory such as compact flash cards, secured digital cards, USB memory devices, memory sticks, and the like.

The various embodiments of the present invention are merely preferred embodiments, and are not intended to limit the scope of the present invention, which includes any modification, equivalent, or improvement that does not depart from the spirit and principles of the present invention.

The invention claimed is:

1. An image acquisition apparatus for capturing images to generate a panorama, the image acquisition apparatus comprising:
   a camera array comprising a plurality of cameras configured to capture a plurality of images to generate a panorama, wherein the relative positions among the plurality of cameras are constant; and
   a camera calibration unit for calibrating the plurality of cameras;
   wherein upon the camera array moves from a first position to a second position, the plurality of cameras are configured to capture images at the first position and the second position, and the camera calibration unit is configured to determine a homogenous transformation matrix between a first camera and a second camera based on the images captured by the first camera and the second camera at the first position and the second position.

2. The image acquisition apparatus of claim 1, wherein the camera calibration unit is configured to identify a feature in the images taken by the first camera at the first position and the second position, and estimate a rotation of the first camera from the first position to the second position based on the feature.

3. The image acquisition apparatus of claim 1, wherein the camera calibration unit is configured to determine a rotation between the first camera and the reference point by minimizing a defined distance.

4. The image acquisition apparatus of claim 3, wherein the camera calibration unit is configured to determine a transformation between the first camera and the reference point by minimizing a re-projection error.

5. The image acquisition apparatus of claim 1, wherein the camera array is configured to move randomly from the first position to the second position.

6. The image acquisition apparatus of claim 1, wherein an axis of the camera array at the first position is not parallel to the axis of the camera array at the second position.

7. The image acquisition apparatus of claim 1, further comprises a sensor for measuring the motion of the camera array.

8. The image acquisition apparatus of claim 7, wherein the sensor is situated at the reference point on the camera array, and configured to measure the rotation and transformation of reference point on the camera array from the first position to the second position.

9. The image acquisition apparatus of claim 1, wherein the camera calibration unit is configured to receive the rotation and transformation of the reference point on the camera array between the first position and the second position.

10. The image acquisition apparatus of claim 1, wherein the first camera and the second camera comprise no over-lapping field of view.

11. The image acquisition apparatus of claim 1, wherein the plurality of cameras are situated on a plane.

12. The image acquisition apparatus of claim 11, wherein the plurality of cameras are situated on the sides of a regular octagon.

13. The image acquisition apparatus of claim 11, wherein each side of the octagon comprises two cameras having parallel optical axes, and the image acquisition apparatus is configured to generate a stereoscopic panorama.

14. A method of calibrating a camera array comprising a plurality of cameras configured to capture a plurality of images to generate a panorama, wherein the relative positions among the plurality of cameras are constant, the method comprising:
   moving the camera array from a first position to a second position;
   measuring a homogeneous transformation matrix of a reference point on the camera array between the first position and the second position;
   capturing images at the first position and the second position by a first camera and a second camera on the camera array; and
   determining a homogenous transformation matrix between the first camera and the second camera based on the images captured by the first camera and the second camera at the first position and the second position.

15. The method of claim 14, further comprising:
   identifying a feature in the images taken by the first camera at the first position and the second position, and estimating a rotation of the first camera from the first position to the second position based on the feature.

16. The method of claim 14, further comprising:
   determining a rotation between the first camera and the reference point by minimizing a defined distance.

17. The image acquisition apparatus of claim 16, further comprising:
   determining a transformation between the first camera and the reference point by minimizing a re-projection error.

18. The method of claim 17, further comprising:
   moving the camera array from the first position to the second position randomly.

19. The method of claim 14, wherein an axis of the camera array at the first position is not parallel to the axis of the camera array at the second position.

20. The method of claim 14, further comprising:
   measuring the homogeneous transformation matrix of the reference point on the camera array between the first position and the second position by a sensor.

21. The method of claim 20, wherein the sensor is situated at the reference point on the camera array, and configured to measure the rotation and transformation of reference point on the camera array from the first position to the second position.

22. The method of claim 14, further comprising:
   receiving the rotation and transformation of the reference point on the camera array between the first position and the second position.

23. The method of claim 14, wherein the first camera and the second camera comprise no over-lapping field of view.

24. The method of claim 14, wherein the plurality of cameras are situated on a plane.

25. The method of claim 24, wherein the plurality of cameras are situated on the sides of a regular octagon.

26. The method of claim 24, wherein each side of the octagon comprises two cameras having parallel optical axes, and the method further comprising:
   generating a stereoscopic panorama using the image captured by the camera array.

* * * * *